United States Patent
Giles et al.

(10) Patent No.: US 10,169,043 B2
(45) Date of Patent: Jan. 1, 2019

(54) EFFICIENT EMULATION OF GUEST ARCHITECTURE INSTRUCTIONS

(71) Applicant: Microsoft Technology Licensing, LLC, Redmond, WA (US)

(72) Inventors: Aaron Sebastian Giles, Issaquah, WA (US); Clarence Siu Yeen Dang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 14/943,847

(22) Filed: Nov. 17, 2015

(65) Prior Publication Data

US 2017/0139712 A1    May 18, 2017

(51) Int. Cl.
  *G06F 9/30*   (2018.01)
  *G06F 9/455*  (2018.01)
  *G06F 15/80*  (2006.01)

(52) U.S. Cl.
  CPC ...... *G06F 9/30105* (2013.01); *G06F 9/45508* (2013.01); *G06F 15/8007* (2013.01)

(58) Field of Classification Search
  CPC ..................... G06F 9/30105; G06F 4/45508
  USPC ......................................................... 712/227
  See application file for complete search history.

(56) References Cited

U.S. PATENT DOCUMENTS

| | | | |
|---|---|---|---|
| 5,685,009 A * | 11/1997 | Blomgren | G06F 9/30014 712/225 |
| 5,978,901 A | 11/1999 | Luedtke et al. | |
| 6,076,155 A * | 6/2000 | Blomgren | G06F 9/30094 712/225 |
| 6,105,129 A * | 8/2000 | Meier | G06F 9/30036 712/222 |
| 6,385,716 B1 | 5/2002 | Henry et al. | |
| 6,651,159 B1 | 11/2003 | Ramesh et al. | |
| 6,763,452 B1 | 7/2004 | Hohensee et al. | |

(Continued)

FOREIGN PATENT DOCUMENTS

WO    2014042976 A2    3/2014

OTHER PUBLICATIONS

Hu, et al., "Godson-3: A Scalable Multicore RISC Processor with X86 Emulatio", In Proceedings of IEEE Micro, vol. 29, Issue 2, Mar. 2009, 13 pages.

(Continued)

*Primary Examiner* — Yuqing Xiao
(74) *Attorney, Agent, or Firm* — Workman Nydegger

(57) ABSTRACT

A method includes determining that an operation should be performed to restore 80 bits stored in memory for an 80 bit register of a guest architecture on a host having 64-bit registers. The method further includes storing 64 bits from the 80 bits in a host register. The method further includes storing the remaining 16 bits from 80 bits in supplemental memory storage. The method further includes identifying a floating point operation that should be performed to operate on the 80-bit register for the guest architecture. As a result, the method further includes using the 64 bits in the host register and the remaining 16 bits stored in memory in a supplemental memory storage to translate a floating point number represented by the 80 bits to a 64-bit floating point number and store the 64-bit floating point number in the host register.

13 Claims, 3 Drawing Sheets

(56) References Cited

U.S. PATENT DOCUMENTS

| | | | |
|---|---|---|---|
| 6,792,523 B1* | 9/2004 | Glew | G06F 9/30036 711/221 |
| 7,284,117 B1 | 10/2007 | Radhakrishnan et al. | |
| 7,849,294 B2* | 12/2010 | Gschwind | G06F 9/30025 712/221 |
| 2003/0126587 A1* | 7/2003 | Rosner | G06F 8/52 717/136 |
| 2010/0274991 A1 | 10/2010 | Duan et al. | |
| 2011/0035745 A1* | 2/2011 | Li | G06F 9/30174 718/1 |
| 2011/0208946 A1 | 8/2011 | Prokopenko et al. | |
| 2013/0290685 A1 | 10/2013 | Corbal San Adrian et al. | |
| 2015/0067301 A1 | 3/2015 | Henry et al. | |

OTHER PUBLICATIONS

Brown, Eric, "Emulator brings x86 Linux apps to ARM devices", Published on: Aug. 22, 2014, Available at: http://linuxgizmos.com/emulator-brings-x86-linux-apps-to-arm-devices/.

International Search Report and Written Opinion issued in PCT Application No. PCT/US2016/061752, dated Feb. 7, 2017.

Karaki et al. "Multiple Instruction Sets Architecture (MISA)" International Conference on Energy Aware Computing (ICEAC), Nov. 30, 2011, pp. 1-6.

Fu et al. "Improving SIMD Code Generation in QEMU" Mar. 9, 2015, pp. 1233-1236.

"FXRSTOR—Restore x87 FPU, MMX(TM) Technology, Streaming SIMD Extensions, and Streaming SIMD Extensions 2 State", Retrieved from http://qcd.phys.cmu.edu/QCDcluster/intel/vtune/reference/vc129.htm, Sep. 9, 2015, 3 Pages.

"Machine Dependent Features", Retrieved from https://web.archive.org/web/20160604071414/http://docs.adacore.com/binutils-docs/html/as_9.html, Jun. 4, 2016, 142 Pages.

Callaham, John, "Google Releases 64-bit Android L Emulator for X86 Intel Processors", Retrieved from https://www.androidcentral.com/google-releases-64-bit-android-l-emulator-intel-processors, Oct. 11, 2014, 3 Pages.

* cited by examiner

EFFICIENT EMULATION OF GUEST ARCHITECTURE INSTRUCTIONS

BACKGROUND

Background and Relevant Art

Computers and computing systems have affected nearly every aspect of modern living. Computers are generally involved in work, recreation, healthcare, transportation, entertainment, household management, etc.

Different computing devices may be implemented using different architectures. For example, two such families of architectures are the x86 architectures developed by Intel Corporation of Santa Clara, Calif., and the ARM architectures, which are RISC architectures developed by ARM Holdings plc of Cambridge, England. Typically, ARM architecture hardware is less expensive than x86 architecture hardware. Therefore, there has been some movement towards implementing low-cost consumer devices using ARM based hardware. However, much of the software that currently exists, and that users desire to use, is for x86 based machines. Thus, there are some efforts to implement software designed for x86 based hardware on ARM hardware to produce low-cost devices that are nonetheless able to run desired software. However, this presents various hardware challenges.

For example, the Intel® IA32 architecture ("x86") contains eight 80-bit floating point registers that can each store either 80-bit floating point data or 64-bit Single Instruction Multiple Data (SIMD) data+16 bits of padding. The eight 80-bit registers and additional registers that contain metadata (e.g. the Tag Word & Status Word) can be saved to memory with full fidelity, such as by using the FSAVE or FXSAVE instructions.

When an x86 emulator running on ARM (or any processor that has 64-bit combined floating point/SIMD registers) is asked to load this buffer back into the register set (e.g., by invoking x86 FRSTOR or FXRSTOR operations), it is ambiguous as to whether an 80-bit value describes floating point or SIMD data. This is problematic because the ARM architecture only contains 64-bit floating point/SIMD registers that ARM instructions can natively manipulate. If the emulator assumed that the 80-bit values were floating point, the emulator could do an 80 bit to 64-bit numerical conversion that roughly maintained the value of the number. That is, the 80-bit floating point number could be translated to a 64-bit floating point number that is sometimes less precise. ARM floating point instructions could then access the 64-bit register. However, if the x86 program had intended to access the 64-bit SIMD data using an SIMD instruction, this content would be corrupted by the conversion from an 80 bit floating point number to a 64-bit floating point number.

If the emulator assumed that the 80-bit values were SIMD values, the emulator could copy the 64-bit SIMD data directly into an ARM register and store the 16 bits of padding in supplemental memory. ARM SIMD instructions could access the 64-bit register. However, if the emulator assumed that the 80-bit values were SIMD values, and the x86 program had intended to access the register as floating point, the 64-bit ARM register would not contain a roughly correct value.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for converting data for 80 bit registers of a guest architecture to data for 64-bit registers on a host system. The method includes determining that an operation should be performed to restore a first set of 80 bits stored in memory for a first 80 bit register of a guest architecture on a host having 64-bit registers. The method further includes storing a first set of 64 bits from the first set of 80 bits stored in memory in a first host register. The method further includes storing a first set of remaining 16 bits from the first set of 80 bits stored in memory in a supplemental memory storage. The method further includes identifying a floating point operation that should be performed to operate on the first 80-bit register for the guest architecture. As a result of identifying a floating point operation that should be performed to operate on the first 80-bit register for the guest architecture, the method further includes using the first set of 64 bits in the first host register and the first set of remaining 16 bits stored in memory in a supplemental memory storage to translate a floating point number represented by the first set of 80 bits to a first 64-bit floating point number and store the first 64-bit floating point number in the first host register.

Another embodiment includes a host system configured to emulate guest architecture instructions on the host system. The host system includes a plurality of host hardware registers. The host system further includes supplemental memory. The host system further includes one or more processors. The host system further includes one or more computer-readable media. The one or more computer-readable media include computer-executable instructions that when executed by at least one of the one or more processors configure the host system to: determine that an operation should be performed to restore a first set of 80 bits stored in memory for a first 80 bit register of a guest architecture on a host having 64-bit registers; store a first set of 64 bits from the first set of 80 bits stored in memory in a first host register; store a first set of remaining 16 bits from the first set of 80 bits stored in memory in a supplemental memory storage; identify a floating point operation that should be performed to operate on the first 80-bit register for the guest architecture; and as a result of identifying a floating point operation that should be performed to operate on the first 80-bit register for the guest architecture, use the first set of 64 bits in the first host register and the first set of remaining 16 bits stored in memory in a supplemental memory storage to translate a floating point number represented by the first set of 80 bits to a first 64-bit floating point number and store the first 64-bit floating point number in the first host register.

Another embodiment illustrated herein includes a method that may be practiced in a computing environment. The method includes acts for converting data for 80 bit registers of a guest architecture to data for 64-bit registers on a host system. The method includes determining that an operation should be performed to restore a first set of 80 bits stored in memory for a first 80 bit register of a guest architecture on a host having 64-bit registers. The method farther includes storing a first set of 64 bits from the first set of 80 bits stored in memory in a first host register. The method further includes storing a first set of remaining 16 bits from the first set of 80 bits stored in memory in a supplemental memory storage. The method further includes identifying a SIMD operation that should be performed to operate on the first 80-bit register for the guest architecture. As a result of identifying a SIMD operation that should be performed to operate on the first 80-bit register for the guest architecture, the method farther includes determining to not convert the first set of 64 bits in the first host register to a floating point number.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may facilitate running x86 based programs on ARM hardware (or any processor that has 64-bit combined floating point/SIMD registers, although ARM is used in the examples below) by facilitating taking 80-bit register data stored in memory (such as by using an FSAVE instruction) and loading (at least a portion of) the 80-bit data into 64-bit registers (and potentially, other portions into supplemental memory). In particular, for a given register, embodiments may load 64 bits of the 80 bit data (in particular, the 64 bits that might represent 64-bit SIMD data) into the ARM 64-bit register and the remaining 16 bits into supplemental memory. Embodiments perform checks on emulated code to determine whether the intent of an operation operating on data in the register is as a floating point operation or an SIMD operation. Once the intent is determined, if the intent is a floating point operation, then a 64-bit floating point number can be created from the 64 bits in the register and the 16 bits stored in supplemental memory, which 64-bit floating point number can then be stored in the 64-bit register. However, if the intent is determined to be an SIMD operation, then no conversion is needed and the data from the ARM 64-bit register and 16 bits in the supplemental memory can be used as-is. In summary, embodiments can delay any needed conversions until instruction intent is determined, to avoid corruption.

In some embodiments, the emulator translates blocks of x86 instructions into blocks of ARM instructions. Most translations of x86 floating point and SIMD instructions will include runtime checks for the mode (as described below) that an 80-bit register is in (unless it can be determined in advance that no conversion will be necessary e.g., in subsequent iterations of a loop as described below). The translation for such instructions will include ARM code for an 80-bit to 64-bit conversion in case it is determined to be needed by the runtime check. However, these checks will not execute until the emulator has finished, the translation of the entire enclosing block and, decides to execute the block.

Figure 1:
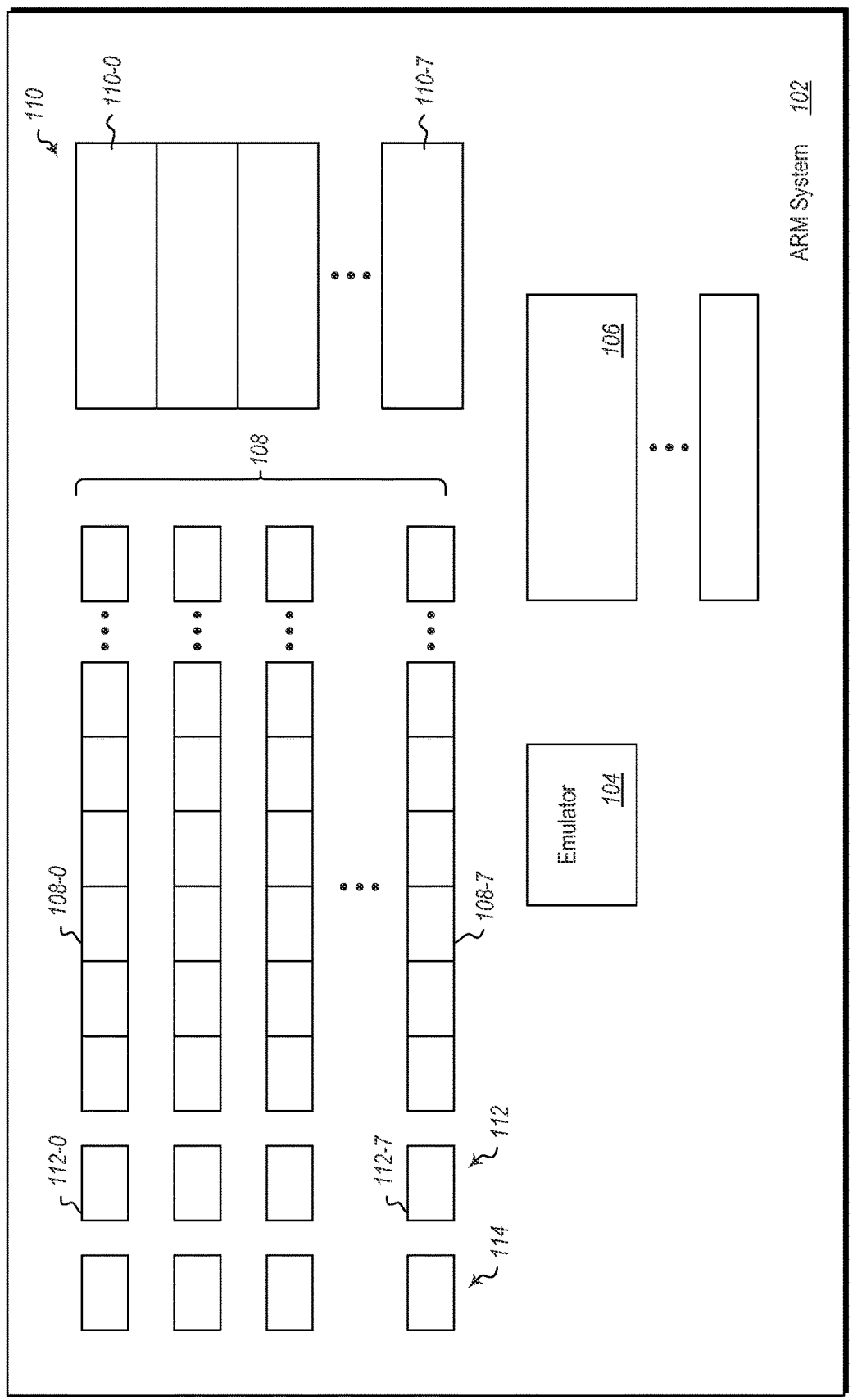
FIG. 1 illustrates a host system configured to execute guest architecture instructions.

The following now illustrates an example of delaying conversion until intent is determined. In particular, embodiments can delay conversion of 80-bit floating point data to 64 bits until x86 program intent is determined. FIG. 1 illustrates an ARM system 102. The ARM system 102 includes an emulator 104. The emulator 104 is configured to facilitate executing x86 programs on the ARM hardware of the ARM system 102. In particular, the emulator 104 can convert x86 programmatic actions to ARM programmatic actions. Additionally, the emulator 104 can marshal data types between the two architectures using knowledge about data type conventions used by the two architectures.

The emulator 104 implements x86 architecture register storage instructions (e.g., FSAVE and/or FXSAVE instructions) to store 80-bit x86 register data values into system memory 106. The emulator 104 implements x86 architecture restore instructions (e.g., FRSTOR and/or FXRSTOR) instructions by loading each 80-bit value verbatim and not performing any 80-bit to 64-bit conversions. In particular, the emulator 104 tentatively assumes that an 80-bit value from the system memory 106 is SIMD, so the emulator 104 loads the 'bottom' 64 bits (i.e., the 64 bits that would be 64-bit SIMD data if the 80-bits represented 64-bit SIMD data) into a register, such as ARM 64-bit register 108-0. The emulator 104 stores the 'top' 16 bits (i.e., the 16 bits used for padding if the 80-bit number represented 64-bit SIMD data) into supplemental memory 110, and in particular, in the example illustrated, at a first line 110-0 of the supplemental memory 110 corresponding to the first register 108-0. Note that supplemental memory 110 may be part of system memory 106 but is shown separately in this example for illustrative clarity. However, the supplemental memory 110 may alternatively be implemented separate from the system memory 106. The emulator 104 sets a mode metadata bit (e.g., bit 112-0) from among a metadata mode bitfield 112 indicating that the 64-bit register 108-0 is in "RAID mode".

The metadata mode bitfield 112 is a set of bits that can be part of a bitmap which maps characteristics of the registers 108. The bitmap may be included, for example, in an overall metadata bitmap of register characteristics. In some embodiments, the bitfield 112 is part of a metadata key which may include other information such as identification of a stack top for the registers 108 and identification of which of the registers 108 contains valid data.

When one or more operations preformed as part of emulating a first x86 instruction attempts to access that 80-bit value, if that instruction is a floating point instruction, the emulator 104 does an 80-bit to 64-bit conversion, updating the value of the register 108-0. This is done by converting the 80-bit floating point number represented by the 64 bits in the register 108-0 and the 16 bits in the first line 110-0 of the supplemental memory 110 to a 64-bit floating point number, and storing the floating point number in the first register 108-0. The emulator clears the corresponding mode metadata bit 112-0 to indicate that the 64-bit register 108-0 is in "floating point mode".

Note that if the instruction does not read the 80-bit value (e.g. FLD DWORD PTR[EDI]), it does not need to actually perform a conversion. However, the corresponding mode metadata bit 112-0 will still be cleared since the newly-loaded value is a floating point value.

When one or more operations performed as part of emulating a first x86 instruction attempts to access that 80-bit value, if that instruction is a SIMD instruction, the emulator does nothing insofar as the 64 bits stored in the register 108-0 and the 16 bits in the first line 110-0 of the supplemental register are concerned as the register 108-0 is already in the correct format.

Essentially, the emulator, with the emulated code, has captured the "intent" of the x86 instruction. This is performed based on the assumption that registers accessed by the operations contain data of the type matching the operations (floating point vs. SIMD) and that this will remain true for future computations involving those registers, until those registers are reloaded from memory or reinitialized. In particular, the mode metadata bit for a given register defines the mode for which the register is used. When registers are used, they are typically used for either floating point operations or for SIMD data. Thus, once a mode is established for a given register, the register is typically not repurposed for the other mode. Thus, for example, if a register $R_0$ is first run in floating point mode, it will continue to be used only for floating point operations until a new FRSTOR or FXRSTOR instruction is emulated or the register is reinitialized by other means (for example, if the register is written to by a SIMD operation). Thus, once the mode for a register is known, and an initial conversion (or non-conversion) to floating point has been performed, subsequent operations can be performed more efficiently knowing the mode of the register. The following illustrates a particular example.

At a first time, the emulator 104 encounters an FRSTOR operation to load data from memory into registers 108-0 and 108-7. While in the illustrated example, only the registers 108-0 and 108-7 are loaded, it should be appreciated that typically, the other six registers will also be loaded, even if the "tag word" specified in the memory to be FRSTOR'ed specifies that those six registers are "empty".

As a result of encountering the FRSTOR operation, the emulator 104 sets the mode metadata bits 112-0 and 112-7, to indicate that the data in the registers 108-0 and 108-7 is SIMD data (although as will be illustrated below, this is not true for this particular data). Not that the mode metadata bits 112 could be implemented in registers or in memory.

The emulator 104 also executes the FRSTOR operation to load values from memory to the registers 108-0 and 108-7 and supplemental memory 110 (and in particular into memory slots 110-0 and 110-7).

Later, the emulator 104 encounters operations emulating a floating point FADD instruction to performing a floating point addition of the data in the registers 108-0 and 108-7.

As a result of encountering the operations emulating an FADD instruction, the emulator 104 checks the state of mode metadata bits 112-0 and 112-7 and sees that bits are set for SIMD mode.

The emulator 104 then executes conversion instructions (which may be been pre-generated when emulating blocks of x86 code) for registers 108-0 and 108-7, which, for each register, take the 64 bits in the register 108-0 and 108-7 and the 16 bits in the supplemental memory 110 lines 110-0 and 110-7 respectively and converts that data to a 64-bit floating point number that is then stored back in the 64-bit registers 108-0 and 108-7 as illustrated above. The emulator 104 clears the metadata bits 112-0 and 112-7 for registers 108-0 and 108-7 respectively to indicate that those registers now store floating point numbers.

The system 102 then uses a native ARM floating point add instruction to add registers 108-0 and 108-7.

An alternative embodiment stores the two converted values into temporary registers (not 108-0 & 108-7), without clearing the metadata bits 112-0 & 112-7. In this embodiment, after performing the arithmetic, the updated value is written to 108-0 (the destination register) and only 112-0 is cleared to indicate floating point data. This allows 108-7 to continuing holding a full precision 80-bit value in case a SIMD instruction later decides to access the bottom 64 bits.

In the illustrated example, the x86 code includes a loop such that the emulator 104 encounters an x86 JNE instruction, which causes processing to jump back to the x86 FADD instruction.

The emulator checks the state of the mode metadata bits 112-0 and 112-7 and determines that these bits have been cleared, indicating that the registers 108-1 and 108-7 contain floating point numbers. At this point, the emulator knows that once registers are cleared for floating point numbers, the metadata bits will not be reset for SIMD data. As such, the second time (and any subsequent times) the emulator emulates FADD, without an intervening reset of the registers (such as by emulating another FRSTOR), the emulator 104 knows it can simply add the registers 108-0 and 108-7 without first performing a conversion to 64-bit floating point. Thus, when looping occurs, several instructions can be eliminated by the emulator, resulting in efficient operation.

For example, assume that approximately the following code is implemented in an x86 application:

---

MOV ECX, 4 // initialize an integer register as a loop counter
FRSTOR // restores data from memory to registers; assume x86 floating point registers R0 & R7 will be restored as non-empty and TOP will be set to 7
loop_iteration:
   FADD ST(0), ST(1) // adds registers 0 and 7 using a floating point operation
   SUB ECX, 1 // subtract 1 from the loop counter
   CMP ECX, 0 // compare the loop counter to zero
   JNE loop_iteration // causes a loop of the FADD instruction if ECX is not zero

---

For the first loop, the emulator 104 would translate this block of code (starting at "loop_iteration") to approximately:

---

Loop_iteration:
   IF the metadata bits are not as expected THEN recompile the block // For instance, if either 112-0 or 112-7 are clear, the block needs to be recompiled
   CONVERT 0 // converts register 0 from 80-bit floating point to 64-bit floating point and clears the mode metadata bit 112-0
   CONVERT 7 // converts register 0 from 80-bit floating point to 64-bit floating point and clears the mode bit 112-7
   ADD 0, 7 // add registers 0 and 7 using a floating point operation
   Subtract 1 from ECX
   IF ECX is nonzero THEN GOTO loop_iteration On the second iteration of the loop, the metadata bits will have changed. Due to the "IF the metadata bits are not as expected" check above, the emulator 104 will recompile the block with fewer instructions (or simply use fewer of the instructions that were already compiled) to be used by the second and subsequent loop iterations:

```
Loop_iteration:
    IF the metadata bits are not as expected THEN recompile the block //
    For this new version of the check, it is expected that 112-0 and 112-7
    are set.
    ADD 0, 7 // add registers 0 and 7 using a floating point operation
    Subtract 1 from ECX
    IF ECX is nonzero THEN GOTO loop_iteration
```

The emulator 104 would know that no conversion was needed because the mode metadata bit 112-0 indicates that register 108-0 is already in floating point mode and metadata bit 112-7 indicates that register 108-7 is already in floating point mode.

Note that the set of mode metadata bits can be reset (in the illustrated example, by setting the bits) by re-initialization. In the illustrated examples, this can be done by emulating an FRSTOR or FXRSTOR instruction. Also note that other logic may be used, such as for example, the bits may be cleared for SIMD mode and set for floating point mode.

In some embodiments, instead of maintaining a "SIMD mode" bit for each of the eight registers as shown in FIG. 1 (e.g., mode metadata bit 112-0 for register 108-0 and mode metadata bit 112-7 for register 108-7), a single bit may be implemented for all eight registers. If the x86 instruction is a floating point instruction, the emulator 104 performs the conversion for all eight registers 108, instead of just the registers accessed by the instruction. This sacrifices some emulation accuracy in return for fewer mode bits to track.

The following illustrates additional functionality including emulating SIMD instructions that write to registers. A SIMD instruction that writes to an 80-bit register sets the bottom 64 bits to the SIMD payload and sets the top 16 bits to all ones. For example, consider the following x86 instructions:

```
LEA EDI, SixtyFourBitsOfZeroes // Assume this loads EDI with the
address of a 64-bit variable that contains zero
    MOVQ MM0, QWORD PTR [EDI]
```

The emulator 104 could choose to translate this to ARM code with the following pseudocode:

```
Set EDI to the address of SixtyFourBitsOfZeroes
Load MM0 with the value pointed to by EDI // This will set register
0 to 64 bits of 0's
Update metadata key field to indicate that register 0 is now in SIMD
mode
    Load a temporary integer register, TEMP, with 0xFFFF // This is 16 1's
    Store TEMP into a supplemental memory location associated with
register 0
```

Some embodiments can emulate this behavior with minimal or no extra overhead. In particular, embodiments in the particular example may include an additional padding bitfield 114 of eight 1's padding metadata bits, one corresponding to each register in the set 108 of registers. Each bit in the bitfield can be used to indicate whether the "top" 16 bits are supposed to be 16 1's used for padding or not. While 1's are illustrated as padding herein, other embodiments may use other padding bits including all 0's, random numbers, 'don't care' bits, etc.

Note that in some embodiments, the padding bitfield 114 is part of an extended version of the metadata key bitfield. In such embodiments, the system already includes functionality for updating this key bitfield such that frequently no extra instructions are needed to update the key to include the padding bitfield 114. Thus, storing padding bits can be achieved with essentially no extra overhead. Code can be eliminated in some embodiments by including the padding bitfield 114 in the metadata key bitfield and updating the padding bitfield 114 when updating the metadata key bitfield. Further, supplemental memory may be conserved by eliminating the need to store all 16 bits of padding. Note that the metadata mode bitfield 112 may also be included in this metadata key bitfield.

Embodiments may add eight extra bits (i.e., the metadata mode bitfield to the metadata key bitfield to track whether each 64-bit host register is in "SIMD mode" or "floating point mode"). This allows the FSAVE/FXSAVE emulation to determine whether to write the 64 bits to system memory literally, plus the 16 bits of padding that were being tracked; or whether to perform a 64-bit to 80-bit conversion.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
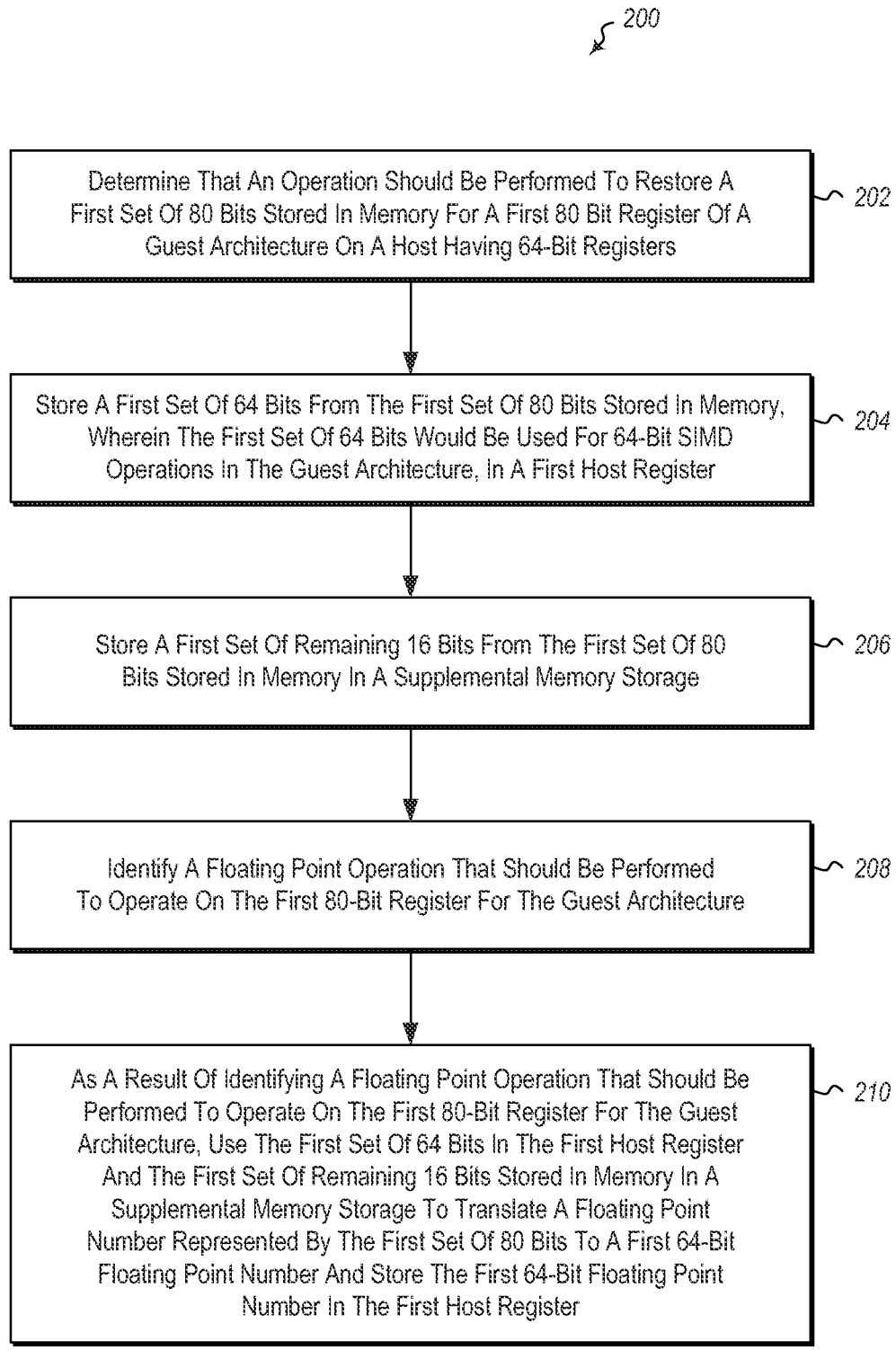
FIG. 2 illustrates a method of converting data for 80 bit registers of a guest architecture to data for 64-bit registers on a host system.

Referring now to FIG. 2, a method 200 is illustrated. The method 200 may be practiced in a computing environment and includes acts for converting data for 80 bit registers of a guest architecture to data for 64-bit registers on a host system. The method includes determining that an operation should be performed to restore a first set of 80 bits stored in memory for a first 80 bit register of a guest architecture on a host having 64-bit registers (act 202). For example, emulation operations for a FRSTOR instruction may be encountered by the emulator 104.

The method 200 further includes storing a first set of 64 bits from the first set of 80 bits stored in memory, wherein the first set of 64 bits could be used for 64-bit SIMD operations in the guest architecture, in a first host register (act 204). For example, 80-bit data from the memory 106 may be stored in a register (such as register 108-1) and supplemental memory (such as memory slot 110-1).

The method 200 further includes storing a first set of remaining 16 bits from the first set of 80 bits stored in memory in a supplemental memory storage (act 206). For example, a set of 16 bits may be stored in supplemental register slot 110-1.

The method 200 further includes identifying a floating point operation that should be performed to operate on the first 80-bit register for the guest architecture (act 208). For example, as illustrated, above, code may be encountered that emulates a block of code including an FADD instruction that specifies the 80-bit guest architecture register as the location of one of the operands of the FADD instruction.

The method 200 further includes as a result of identifying a floating point operation that should be performed to operate on the first 80-bit register for the guest architecture, using the first set of 64 bits in the first host register and the first set of remaining 16 bits stored in memory in a supplemental memory storage to translate a floating point number represented by the first set of 80 bits to a first 64-bit floating point number and store the first 64-bit floating point number in the first host register (act 210).

The method 200 may further include determining that an operation should be performed to restore a second set of 80 bits stored in memory for a second 80 bit register of a guest architecture on a host having 64-bit registers; storing a second set of 64 bits from the second set of 80 bits stored in memory, wherein the second set of 64 bits could be used for 64-bit SIMD operations in the guest architecture, in a second host register; storing a second set of remaining 16 bits from the second set of 80 bits stored in memory in a supplemental memory storage; identifying a SIMD operation that should be performed to operate on the second 80-bit register for the guest architecture; and as a result of identifying a SIMD operation that should be performed to operate on the second 80-bit register for the guest architecture, determining to not convert the second set of 64 bits in the first host register to a floating point number.

Such embodiments of the method 200 may further include documenting that the remaining 16 bits in supplemental memory storage are padding bits. For example, documenting that the remaining 16 bits in supplemental memory storage are padding bits may include one of setting or clearing a bit in a bitmap of the 64-bit registers.

The method 200 may further include documenting that the first host register is in floating point mode. For example, documenting that the first host register is in floating point mode may include one of setting or clearing a bit in a bitmap of the 64-bit registers. Such embodiments may further include identifying a second floating point operation that should be performed after the floating point operation to operate on the first 80-bit register for the guest architecture; as a result of documenting that first host register is in floating point mode, identifying that the first host register is in floating point mode; and as a result of identifying that the first host register is in floating point mode: determining to not convert a value already in the first host register and performing the second guest architecture floating point instruction with the value already in the first host register.

Figure 3:
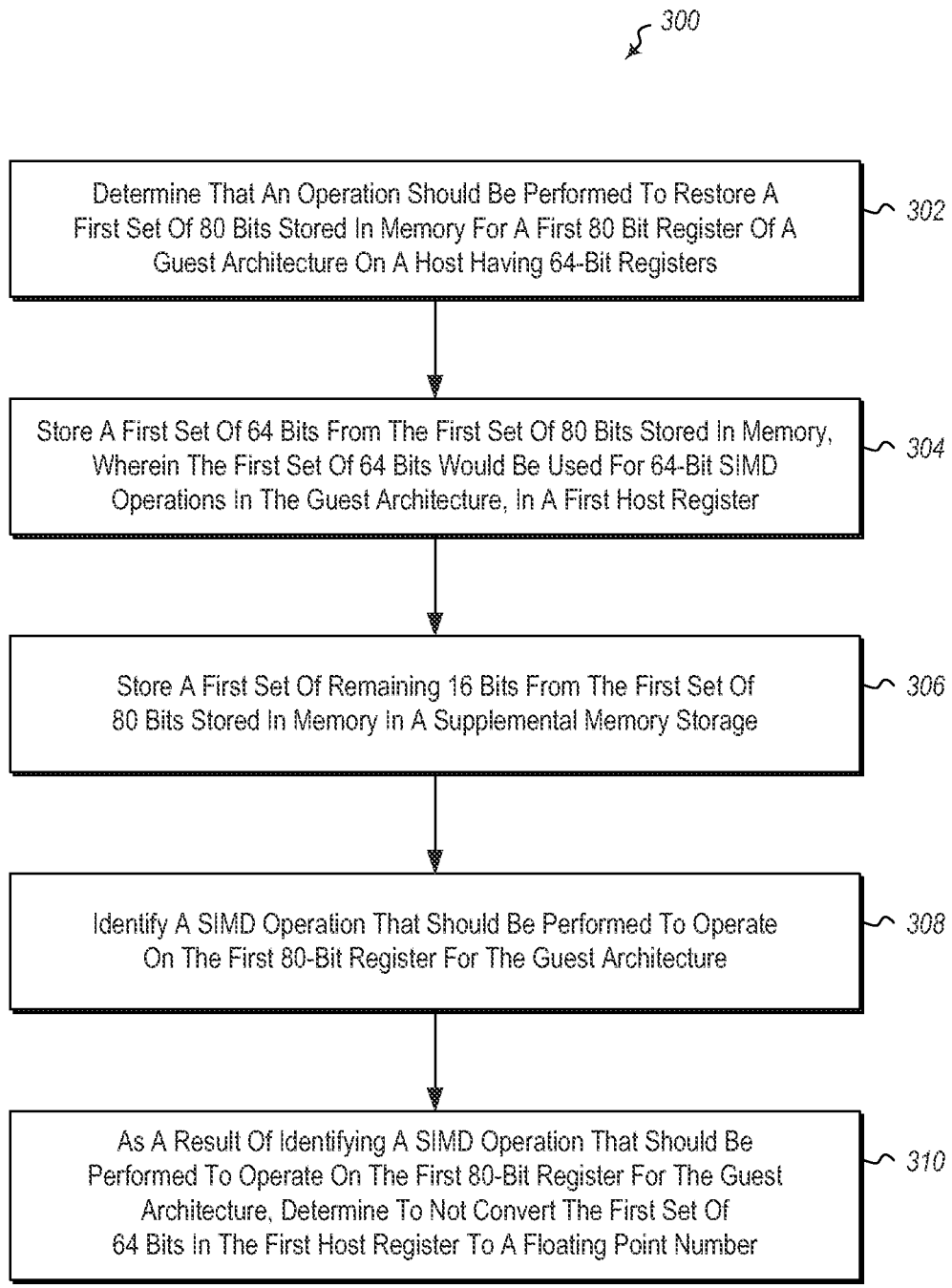
FIG. 3 illustrates another method of converting data for 80 bit registers of a guest architecture to data for 64-bit registers on a host system.

Referring now to FIG. 3, a method 300 is illustrated. The method 300 may be practiced in a computing environment and includes acts for converting data for 80 bit registers of a guest architecture to data for 64-bit registers on a host system. The method 300 includes determining that an operation should be performed to restore a first set of 80 bits stored in memory for a first 80 bit register of a guest architecture on a host having 64-bit registers (act 302).

The method 300 further includes storing a first set of 64 bits from the first set of 80 bits stored in memory, wherein the first set of 64 bits could be used for 64-bit SIMD operations in the guest architecture, in a first host register (act 304).

The method 300 further includes storing a first set of remaining 16 bits from the first set of 80 bits stored in memory in a supplemental memory storage (act 306).

The method 300 further includes identifying a SIMD operation that should be performed to operate on the first 80-bit register for the guest architecture (act 308).

The method 300 further includes as a result of identifying a SIMD operation that should be performed to operate on the first 80-bit register for the guest architecture, determining to not convert the first set of 64 bits in the first host register to a floating point number (act 310).

The method 300 may further include documenting that the remaining 16 bits in supplemental memory storage are padding bits. For example, documenting that the remaining 16 bits in supplemental memory storage are padding bits may include one of setting or clearing a bit in a bitmap of the 64-bit registers. Further, documenting that the remaining 16 bits in supplemental memory storage are padding bits may include one of setting or clearing a bit in a metadata bitmap of the 64-bit registers which includes indications of whether or not registers are empty and an indication of a stack top register. Alternatively or additionally, documenting that the remaining 16 bits in supplemental memory storage are padding bits may include one of setting or clearing a bit in a metadata bitmap of the 64-bit registers which includes one bit for each register such that a single bit can be used from the padding metadata bits to indicate that, for a single register, a set of 16 bits stored in supplemental memory contains padding bits. Note that embodiments may further include one bit per 80-bit x86 register that indicates whether the register is in floating point mode or SIMD mode.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa).

For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard. Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Note that while the embodiments above make reference to 64-bit registers, the invention is not limited to 64-bit processors. In particular, it is possible to support embodiments of the invention on a "32-bit" processor: 32-bit ARM has 32-bit integer registers but 64-bit floating point/SIMD registers. Thus, for example, embodiments can be implemented on 32-bit ARM.

What is claimed is:

1. In a computing environment a method of converting data for 80 bit registers of a guest architecture to data for 64-bit registers on a host system, the method comprising:

determining that an operation should be performed to restore a first set of 80 bits stored in memory for a first 80 bit register of a guest architecture on a host having 64-bit registers;

storing a first set of 64 bits from the first set of 80 bits stored in memory, wherein the first set of 64 bits could be used for 64-bit SIMD operations in the guest architecture, in a first host register;

storing a first set of remaining 16 bits from the first set of 80 bits stored in memory in a supplemental memory storage;

documenting that the remaining 16 bits stored in the supplemental memory are padding bits;

identifying a SIMD operation that should be performed to operate on the first 80-bit register for the guest architecture; and as a result of identifying a SIMD operation that should be performed to operate on the first 80-bit register for the guest architecture, determining to not convert the first set of 64 bits in the first host register to a floating point number.

2. The method claim 1, wherein documenting that the remaining 16 bits in supplemental memory storage are padding bits comprises one of setting or clearing a bit in a bitmap of the 64-bit registers.

3. The method claim 1, wherein documenting that the remaining 16 bits in supplemental memory storage are padding bits comprises one of setting or clearing a bit in a metadata bitmap of the 64-bit registers which includes indications of whether or not registers are empty and an indication of a stack top register.

4. The method claim 1, wherein documenting that the remaining 16 bits in supplemental memory storage are padding bits comprises one of setting or clearing a bit in a metadata bitmap of the 64-bit registers which includes one bit for each register such that a single bit can be used from the metadata bitmap to indicate that, for a single register, a set of 16 bits stored in supplemental memory contains padding bits.

5. In a computing environment a method of converting data for 80 bit registers of a guest architecture to data for 64-bit registers on a host system, the method comprising:

determining that an operation should be performed to restore a first set of 80 bits stored in memory for a first 80 bit register of a guest architecture on a host having 64-bit registers;

splitting and storing the data from the first 80 bit register unevenly in two memory locations, including a first memory location and a second memory location and by storing a first set of 64 bits from the first set of 80 bits stored in the first memory location, wherein the first set of 64 bits could be used for 64-bit SIMD operations in the guest architecture, in a first host register, and storing a first set of remaining 16 bits from the first set of 80 bits stored in the second memory location comprising supplemental memory storage;

identifying a floating point operation that should operate on the first 80-bit register for the guest architecture; and as a result of identifying a floating point operation that should operate on the first 80-bit register for the guest architecture, using the first set of 64 bits and the first set of remaining 16 bits to translate a floating point number represented by the first set of 80 bits to a first 64-bit floating point number and store the first 64-bit floating point number in the first host register, determining that an operation should be performed to restore a second set of 80 bits stored in memory for a second 80 bit register of a guest architecture on a host having 64-bit registers;

storing a second set of 64 bits from the second set of 80 bits stored in memory, wherein the second set of 64 bits could be used for 64-bit SIMD operations in the guest architecture, in a second host register;

storing a second set of remaining 16 bits from the second set of 80 bits stored in memory in a supplemental memory storage;

identifying a SIMD operation that should operate on the second 80-bit register for the guest architecture; and as a result of identifying a SIMD operation that should operate on the second 80-bit register for the guest architecture, determining to not covert the second set of 64 bits in the second host register to a floating point number; and documenting that the remaining 16 bits of the second set of 64 bits in supplemental memory storage are padding bits.

6. The method claim 5, wherein documenting that the remaining 16 bits of the second set of 64 bits in supplemental memory storage are padding bits comprises one of setting or clearing a bit in a bitmap of the 64-bit registers.

7. The method of claim 5 further comprising, documenting that first host register is in floating point mode.

8. The method of claim 7, wherein documenting that the first host register is in floating point mode comprises modifying at least one bit and wherein the at least one bit is a mode bit in a bitmap of the 64 bit registers.

9. The method of claim 7, further comprising:

identifying a second floating point operation that should be performed after the floating point operation to operate on the first 80-bit register for the guest architecture;

as a result of documenting that first host register is in floating point mode, identifying that the first host register is in floating point mode; and as a result of identifying that the first host register is in floating point mode:
 determining to not convert a value already in the first host register; and
 performing the second floating point operation with the value already in the first host register.

10. A host system configured to emulate guest architecture instructions on the host system, the host system comprising:
 a plurality of host hardware registers;
 supplemental memory;
 one or more processors; and
 one or more computer-readable media, wherein the one or more computer-readable media comprise computer-executable instructions that when executed by at least one of the one or more processors configure the host system to perform the following:
  determine that an operation should be performed to restore a first set of 80 bits stored in memory for a first 80 bit register of a guest architecture on a host having 64-bit registers;

store a first set of 64 bits from the first set of 80 bits stored in memory, wherein the first set of 64 bits could be used for 64-bit SIMD operations in the guest architecture, in a first host register;

store a first set of remaining 16 bits from the first set of 80 bits stored in memory in a supplemental memory storage;

storing a set of padding metadata bits that is usable to indicate whether the first set of remaining 16 bits stored in supplemental memory contains padding bits or not;

identify a floating point operation that should be called to operate on the first 80-bit register for the guest architecture; and as a result of identifying a floating point operation that should be called to operate on the first 80-bit register for the guest architecture, use the first set of 64 bits and the first set of remaining 16 bits to translate a floating point number represented by the first set of 80 bits to a first 64-bit floating point number and store the first 64-bit floating point number in the first host register.

11. The host system of claim 10, wherein the one or more computer-readable media further comprise computer-executable instructions that when executed by at least one of the one or more processors cause at least one of the one or more processors to perform the following:

determine that an operation should be performed to restore a second set of 80 bits stored in memory for a second 80 bit register of a guest architecture on a host having 64-bit registers;

store a second set of 64 bits from the second set of 80 bits stored in memory, wherein the second set of 64 bits could be used for 64-bit SIMD operations in the guest architecture, in a second host register;

store a second set of remaining 16 bits from the second set of 80 bits stored in memory in a supplemental memory storage;

identify a SIMD operation that should be performed to operate on the second 80-bit register for the guest architecture; and as a result of identifying a SIMD operation that should be called to operate on the second 80-bit register for the guest architecture, determine to not convert the second set of 64 bits in the second host register to a floating point number.

12. The host system of claim 10, wherein the set of padding metadata bits are included in a metadata key that comprises information about a stack top register and information about whether or not a register is empty.

13. The host system of claim 10, wherein the set of padding metadata bits includes one bit for each register such that a single bit can be used from the padding metadata bits to indicate that, for a single register, a set of 16 bits stored in supplemental memory contains padding bits.

* * * * *